United States Patent [19]
Matsushita et al.

[11] Patent Number: 5,866,653
[45] Date of Patent: Feb. 2, 1999

[54] CURABLE SILICONE RUBBER COMPOSITION AND MANUFACTURING METHOD THEREOF

[75] Inventors: Takao Matsushita; Osamu Takuman, both of Chiba Prefecture, Japan

[73] Assignee: Dow Corning Toray Silicone Co., Ltd., Tokyo, Japan

[21] Appl. No.: 990,865

[22] Filed: Dec. 15, 1997

[51] Int. Cl.$^6$ .............. C08K 5/24; C08K 5/23; C08K 3/36; C08G 77/06
[52] U.S. Cl. .......... 524/731; 524/715; 524/720; 524/847; 528/15; 528/24
[58] Field of Search .................... 524/715, 720, 524/731, 847; 528/15, 24

[56] References Cited

U.S. PATENT DOCUMENTS

| | | | |
|---|---|---|---|
| 3,419,593 | 12/1968 | Willing | 528/15 |
| 5,516,838 | 5/1996 | Fujiki et al. | 524/731 |

FOREIGN PATENT DOCUMENTS

| | | |
|---|---|---|
| 44-2591 | of 1969 | Japan . |
| 47-21826 | of 1972 | Japan . |
| 51-23979 | of 1976 | Japan . |
| 51-35501 | of 1976 | Japan . |

*Primary Examiner*—Peter A. Szekely
*Attorney, Agent, or Firm*—Jennifer S. Warren

[57] ABSTRACT

A curable silicone rubber composition comprising (A) organopolysiloxane comprising at least 2 silicon atom-bonded alkenyl groups in each molecule described by formula $R_aSiO_{(4-a)/2}$, where R represents a substituted or unsubstituted monovalent hydrocarbon group and a is a number from 1.95 to 2.05; (B) fine powdery silica; (C) a reaction mixture of (a) a platinum compound and (b) a compound containing an alkynyl group and an alcoholic hydroxy group in each molecule; and (D) a curing agent. The present invention is also a manufacturing method of curable silicone rubber composition. The curable silicone rubber compositions have an excellent flame-retarding property and good tracking resistance and other electrical properties.

17 Claims, No Drawings

CURABLE SILICONE RUBBER COMPOSITION AND MANUFACTURING METHOD THEREOF

BACKGROUND OF THE INVENTION

This invention pertains to a type of curable silicone rubber composition. More specifically, this invention pertains to a type of curable silicone rubber composition that has excellent flame-retarding property and good electrical characteristics, as well as its manufacturing method.

Silicone rubber has excellent properties, such as heat resistance, weatherability, and electrical characteristics and is therefore used in various fields. However, the conventional silicone rubber has the disadvantage of being flammable. Consequently, various types of compounds have been proposed to develop self-extinguishable (flame-retarding) silicone rubber. For example, Japanese Kokoku Patent No. Sho 44(1969)-2591 proposed a type of composition prepared by adding hexachloroplatinic acid, platinum-olefin complex, or another platinum compound to a silicone rubber composition. However, when this type of platinum compound is used alone the effect in improving the flame-retarding property is small. Consequently, people have proposed many types of compositions prepared by combining platinum compounds with inorganic fillers so as to improve the flame-retarding property, such as the composition prepared by adding a platinum compound and fumed titanium dioxide to a silicone rubber composition (Japanese Kokoku Patent No. Sho 47(1972)-21826), the composition prepared by adding a platinum compound and fine powdery manganese carbonate to a silicone rubber composition (Japanese Kokoku Patent No. Sho 51(1976)-23979), and the composition prepared by adding a platinum compound and iron oxide to a silicone rubber composition (Japanese Kokoku Patent No. Sho 51(1976)-35501).

However, these silicone rubber compositions still fail to provide a satisfactory flame-retarding property. In addition, the aforementioned composition prepared by adding a platinum compound and fumed titanium dioxide has the disadvantage of the electrical characteristics of the silicone rubber deteriorating due to moisture. The aforementioned composition prepared by adding a platinum compound and fine powdery manganese carbonate has the disadvantage that when an acyl-type organic peroxide is used as a curing agent, curing is hampered, and the compound cannot be cured well. The aforementioned composition prepared by adding a platinum compound and iron oxide has the disadvantage that if the amount of iron oxide is not large it is hard to improve the flame-retarding property, yet a large content of iron oxide leads to deterioration in the mechanical strength of the cured silicone rubber.

It has been found that for these silicone rubber compositions, the flame-retarding property is improved when the content of the inorganic filler, a nonflammable ingredient, is increased, and it can be further improved when the content of the polyorganosiloxane, a flammable substance, is reduced. However, for the silicone rubber compositions prepared by adopting these measures, the moldability is poor, and the mechanical strength of the silicone rubber molding after heat curing decreases. Due to these disadvantages, their applications are limited.

It has been found by the present inventors that when prescribed additives are added to a prescribed type of curable silicone rubber composition the flame-retarding property of the silicone rubber is drastically increased after curing. Also, the electrical characteristics as represented by tracking resistance can be improved significantly.

Therefore, the purpose of this invention is to provide a type of curable silicone rubber composition that can form silicone rubber with excellent flame-retarding property and electrical characteristics without sacrificing mechanical strength after curing. This invention also provides a manufacturing method for this type of curable silicone rubber composition.

SUMMARY OF THE INVENTION

The present invention is a curable silicone rubber composition comprising (A) organopolysiloxane comprising at least 2 silicon atom-bonded alkenyl groups in each molecule described by formula $R_aSiO_{(4-a)/2}$, where R represents a substituted or unsubstituted monovalent hydrocarbon group and a is a number from 1.95 to 2.05; (B) fine powdery silica; (C) a reaction mixture of (a) a platinum compound and (b) a compound comprising an alkynyl group and an alcoholic hydroxy group in each molecule; and (D) a curing agent. The present invention is also a manufacturing method for the present curable silicone rubber compositions. The curable silicone rubber compositions have an excellent flame-retarding property and good tracking resistance and other electrical properties.

DESCRIPTION OF THE INVENTION

This invention is a curable silicone rubber composition comprising
(A) 100 parts by weight polyorganosiloxane comprising at least 2 silicon atom-bonded alkenyl groups in each molecule described by formula $R_aSiO_{(4-a)/2}$, where R represents a substituted or unsubstituted monovalent hydrocarbon group and a is a number from 1.95 to 2.05;
(B) 10 to 100 parts by weight fine powdery silica;
(C) a reaction mixture of (a) a platinum compound and (b) a compound comprising an alkynyl group and an alcoholic hydroxy group in each molecule in an amount providing a platinum concentration in the range of 1 to 1000 parts by weight with respect to 1 million parts by weight of ingredient (A); and
(D) a curing agent in an amount sufficient for curing the composition.

The present invention also comprises a curable silicone rubber composition comprising
(A) 100 parts by weight polyorganosiloxane comprising at least 2 silicon atom-bonded alkenyl groups in each molecule described by formula $R_aSiO_{(4-a)/2}$, where R represents a substituted or unsubstituted monovalent hydrocarbon group and a is a number from 1.95 to 2.05;
(B) 10 to 100 parts by weight fine powdery silica;
(C) a reaction mixture of (a) a platinum compound and (b) a compound comprising an alkynyl group and alcoholic hydroxy group in each molecule in an amount providing a platinum concentration in the range of 1 to 1000 parts by weight with respect to 1 million parts by weight of ingredient (A);
(E) 0.01 to 10 parts by weight of a triazole compound; and
(D) a curing agent in an amount sufficient for curing the composition. The invention also relates to a method for preparing the above described compositions.

The polyorganosiloxane as ingredient (A) used in the curable silicone rubber composition of this invention is the principal ingredient and it is described by the formula $R_aSiO_{(4-a)/2}$. In this formula, R represents a substituted or unsubstituted monovalent hydrocarbon group, such as methyl, ethyl, propyl, and other alkyl groups; vinyl, allyl, butenyl, hexenyl, and other alkenyl groups; phenyl and other aryl groups; 3,3,3-trifluoropropyl; 2-phenylethyl; and 2-cyanoethyl. It is preferred that 50 mol % or more of the R substituents in each molecule be methyl groups. In the formula, a is a number in the range of 1.95 to 2.05. For ingredient (A), there must be at least two silicon atom-bonded alkenyl groups in each molecule. The bonding sites of the alkenyl groups may be pendant and/or terminal sites. The molecular configuration of this ingredient may be a simple straight chain or a straight chain having branches on a portion. There is no special limitation on the viscosity of this ingredient. Usually, the viscosity at 25° C. should be in the range of 100 to 20,000,000 mPaxs. Ingredient (A) may be either a homopolymer or copolymer, or a mixture of homopolymers and copolymers. Examples of the siloxy units forming ingredient (A) include dimethylsiloxy units, vinylmethylsiloxy units, methylphenylsiloxy units, and (3,3,3-trifluoropropyl)methylsiloxy units. Examples of the molecular terminal groups of ingredient (A) include trimethylsiloxy, dimethylhydroxysiloxy, vinyldimethylsiloxy, and vinylmethylhydroxysiloxy. Examples of the polyorganosiloxanes of ingredient (A) include dimethylsiloxane/vinylmethylsiloxane copolymer end-blocked with vinyldimethylsiloxy groups, polydimethylsiloxane end-blocked with vinyldimethylsiloxy groups, dimethylsiloxane/vinylmethylsiloxane copolymer end-blocked with dimethylhydroxysiloxy groups, dimethylsiloxane/vinylmethylsiloxane copolymer end-blocked with vinylmethylhydroxysiloxy groups, and dimethylsiloxane/methylphenylsiloxane/vinylmethylsiloxane copolymer end-blocked with vinyldimethylsiloxy groups.

The fine powdery silica used as ingredient (B) in this invention acts as a reinforcing or semi-reinforcing filler. It is a necessary ingredient to improve the mechanical strength of the silicone rubber obtained after curing of the curable silicone rubber composition of this invention. Examples of the fine powdery silica include fumed silica and other silicas prepared by dry processing methods; precipitated silica and other silicas prepared using wet processing methods; and other reinforcing fine powdery silicas; quartz powder, diatomeous earth, and other semi-reinforcing fine powdery silicas. For this ingredient, fine powdery silica with a particle size of 50 mm or smaller and a specific surface area of 50 $m^2/g$ or greater is preferred. In addition it is preferred that the fine powdery silica have its surface hydrophobed by treatment with an organosilane, organodisilazane, organosiloxane oligomer, or another organic silicon compound. If the amount of ingredient (B) is too small, the mechanical strength of the cured silicone rubber decreases. On the other hand, if the amount of ingredient (B) is too large, it becomes hard to add to ingredient (A). Consequently, the amount of ingredient (B) should be in the range of 10 to 100 parts by weight with respect to 100 parts by weight of ingredient (A). If the amount of ingredient (B) is less than 10 parts by weight, the mechanical strength of the composition of this invention after curing becomes lower. On the other hand, if the amount of ingredient (B) is over 100 parts by weight, it becomes hard to add to ingredient (A).

The reaction mixture of a platinum compound and a compound comprising an alkynyl group and alcoholic hydroxy group in each molecule as ingredient (C) used in this invention is a distinguishing ingredient of the present composition. By adding ingredient (C), the flame-retarding property of the silicone rubber after curing can be improved greatly. The term "reaction mixture" of the platinum compound and the compound comprising an alkynyl group and an alcoholic hydroxy group in each molecule means the product of a reaction between these two compounds, or a mixture of the reaction product and both or either of the feed materials, that is, the platinum compound and/or the compound containing an alkynyl group and an alcoholic hydroxy group in each molecule. There is no special limitation on the type of the platinum compound of ingredient (a), as long as the platinum compound can react with ingredient (b). Examples of the platinum compounds include hexachloroplatinic acid, potassium salt and sodium salt of hexachloroplatinic acid, complexes of hexachloroplatinic acid and olefins, complexes of hexachloroplatinic acid and alkenylsiloxanes, and diketone complexes of platinum and of platinum dichloride. Preferred is the platinum-alkenylsiloxane complexes and hexachloroplatinic acid disclosed in Japanese Kokoku Patent No. Sho 42(1967)-22924. The preferable compound comprising an alkynyl group and an alcoholic hydroxy group in each molecule of ingredient (b) is the compound having the alkynyl group and alcoholic hydroxy group bonded to at least one carbon atom. Examples of such compounds include 3,5-dimethyl-1-hexyn-3-ol, 2-methyl-3-butyn-2-ol, 2-phenyl-3-butyn-2-ol, and 1-ethynyl-1-cyclohexanol.

The ratio by weight of ingredient (a) to ingredient (b) is preferably in the range of 1:0.1 to 1:100 and more preferably in the range of 1:1 to 1:50. Also, the molar amount of ingredient (b) is preferably larger than the molar amount of ingredient (a). This reaction mixture can be prepared, for example, by mixing ingredient (a) and ingredient (b) by shaking at room temperature or by heating and then allowing the mixture to stand.

The amount of ingredient (C) with respect to 1 million parts by weight of ingredient (A) should correspond to a platinum amount in the range of 1 to 1000 parts by weight and preferably in the range of 10 to 200 parts by weight. If the amount of ingredient (C) provides less than 1 part by weight of platinum it is impossible to realize the desired high flame-retarding property and tracking resistance property and other electrical characteristics. On the other hand if the amount of platinum provided by ingredient (C) is over 1000 parts by weight the extra amount added does not provide any benefit.

The curing agent as ingredient (D) used in this invention is for curing the composition. Typical examples of ingredient (D) include organic peroxides such as benzoyl peroxide, t-butyl perbenzoate, 2,4-dicyclobenzoyl peroxide, dicumyl peroxide, and 2,5-dimethyl-2,5-di(t-butylperoxy)hexane.

The curing agent as ingredient (D) in the present composition may comprise a polyorganohydrogensiloxane having 3 or more silicon atom-bonded hydrogen atoms in each molecule and a catalyst for effecting a hydrosilylation reaction. In this situation, the polyorganohydrogensiloxane is a crosslinking agent. That is, the silicon atom-bonded hydrogen atoms in the polyorganohydrogensiloxane undergo an addition reaction with the silicon atom-bonded alkenyl groups in ingredient (A) in the presence of a hydrosilylation catalyst. The polyorganohydrogen-siloxane must have 3 or more silicon atom-bonded hydrogen atoms in each molecule. Examples of silicon atom-bonded organic groups, other than the silicon atom-bonded hydrogen atoms, in the polyorganohydrogensiloxane include methyl, ethyl, propyl, and other alkyl groups; phenyl, tolyl, and other aryl groups; and 3,3,3-trifluoropropyl, 3-chloropropyl, and other substituted alkyl groups.

The molecular structure of the polyorganohydrogensiloxane crosslinker may be straight chain, branch-containing straight chain, ring, or network. There is no special limitation on the polyorganohydrogensiloxane crosslinker viscosity. It is preferred that the viscosity of the polyorganohydrogensiloxane at 25° C. be in the range of 3 to 10,000 mPa×s. The amount of the polyorganohydrogensiloxane added as crosslinker should be such that the ratio of the molar amount of the silicon atom-bonded hydrogen atoms to the molar amount of the silicon atom-bonded alkenyl groups of ingredient (A) is in the range of 0.5:1 to 20:1 and preferably in the range of 1:1 to 1:3. If this molar ratio is smaller than 0.5, curing of the composition of this invention is insufficient. On the other hand, if the molar ratio is larger than 20 hydrogen gas is generated leading to foaming.

The catalyst for the hydrosilylation reaction used together with the polyorganohydrogensiloxane provides a method of curing of the present composition. The catalyst may be a platinum series metal, a platinum series metal compound, or a compound mainly composed of a platinum series metal. Examples of the platinum series metal catalyst for the hydrosilylation reaction include fine powdery platinum, hexachloroplatinic acid, alcohol-modified hexachloroplatinic acid salt, a complex of platinum and a diketone, a platinum-olefin complex, a complex of hexachloroplatinic acid and an alkenylsiloxane, as well as materials prepared by supporting such platinum series metal catalysts on alumina, silica, carbon black, and other carriers, excluding that corresponding to ingredient (C). The amount of the hydrosilylation catalyst useful in the present composition depends on the type of the catalyst and there is no special limitation on the amount added. Usually, with respect to 1 million parts by weight ingredient (A), the amount of the platinum series metal should be in the range of 1 to 500 parts by weight and preferably in the range of 5 to 100 parts by weight.

A triazole compound as ingredient (E) is added when it is necessary to further improve the flame-retarding property of the composition comprising components (A) to (D). Examples of the triazole compounds include benzotriazole, 1,2,3-triazole, 1,2,4-triazole, and their derivatives. Specific examples of useful triazole compounds include benzotriazole, 1-methylbenzotriazole, 5,6-dimethylbenzotriazole, 2-phenylbenzotriazole, 1-methyl-1,2,3-triazole, 1-phenyl-1,2,3-triazole, 4-methyl-2-phenyl-1,2,3-triazole, 1-methyl-1,2,4-triazole, and 1,3-diphenyl-1,2,4-triazole. The amount of the triazole compound added with respect to 100 parts by weight of component (A) should be in the range of 0.01 to 10 parts by weight.

In addition to ingredients (A) through (D) or ingredients (A) through (E), as long as the purpose of this invention is not compromised, the composition of this invention may also contain various conventionally known additives, such as non-reinforcing fillers, pigments, heat resistant agents, flame retardants, internal mold release agents, and plasticizers. Examples of non-reinforcing fillers that can be used include calcium carbonate, mica, magnesium oxide, aluminum oxide, and magnesium hydroxide. Examples of pigments that can be used include carbon black, red iron oxide, and titanium dioxide. Examples of the heat-resistant agents include rare-earth oxides, rare-earth hydroxides, cerium silanolate, and cerium fatty acid salts. Examples of the flame retardants include fumed titanium dioxide, carbon black in small amounts, and manganese carbonate.

The composition of this invention can be manufactured by uniformly blending prescribed amounts of ingredients (A) through (D) or ingredients (A) through (E). However, it is preferred that the composition be prepared as follows: ingredient (A) and ingredient (B) are blended, preferably under heating, to form a silicone rubber base; then, ingredients (C) and (D) or ingredients (C), (E) and (D) are added and blended. When the reinforcing fine powdery silica having a specific surface area of 50 $m^2/g$ or greater, ingredient (B), is not treated to make hydrophobic, it is preferred that for 100 parts by weight ingredient (A) that 1 to 30 parts by weight of a plasticizer such as a silanol-terminated diorganosiloxane oligomer or hexaorganodisilazane and water also be added. A kneader mixer, biaxial extruder, or other conventional mixer may be used to mix ingredients (A) and (B) to form a silicone rubber base. When ingredients (C), (E) and (D) are added, it is possible to use a two-roll mixer, kneader mixer, or other mixer to carry out the operation.

When the composition of this invention is cured using an organic peroxide as the curing agent, heating and curing should be carried out at a temperature higher than the decomposing temperature of the organic peroxide such as in the range of 130° to 200° C. When a polyorganohydrogensiloxane and a catalyst for hydrosilylation reaction are used, the heating and curing operation should be carried out at a temperature in the range of 70° to 200° C. As the method for molding of the curable silicone rubber composition, the conventional molding methods, such as compression molding and extrusion molding may be selected as appropriate.

The present composition has excellent flame-retarding properties and good electrical characteristics represented by tracking resistance, arc resistance, and erosion resistance without sacrificing mechanical strength after curing. Consequently, the present composition can be used in applications where these characteristics are required, such as electrical insulating materials for automobile parts, electrical appliances, and electrical cable covering materials.

In the following examples the present invention will be explained in more detail. In these examples, "parts" refers to parts by weight, and the viscosity data refer to those measured at 25° C. In the examples measurement of the physical properties of the silicone rubber, measurement of the flame-retarding property, and measurement of the electrical characteristics were carried out using the following methods.

Measurement of physical properties of silicone rubber. The measurements were performed according to JIS K 6301 method of measurement of the physical characteristics of cured rubber. In this method the curable silicone rubber composition was filled into dies for molding of sheets and was subject to compression molding at 170° C. for 10 minutes to form a 2 mm thick silicone rubber sheet. When the curable silicone rubber composition was a liquid silicone rubber the compression molding operation was carried out at 200° C. for 10 min to form a 2 mm thick silicone rubber sheet. The strength of this silicone rubber sheet was measured using the method of JIS K 6301.

Measurement of flame-retarding property. This property was measured in accordance with UL-94. The curable silicone rubber composition was filled into a mold for sheet formation and compression molded at 170° C. for 10 minutes to form a 1 mm thick silicone rubber sheet. When the curable silicone rubber composition was a liquid silicone rubber compound, the compression molding operation was carried out at 200° C. for 10 minutes to form a 1 mm thick silicone rubber sheet. Subsequently, the silicone rubber sheets were cut into test specimens measuring 130 mm in length, 13 mm in width, and 1 mm in thickness. Each specimen was fixed vertically in a draft free area and ignited by the flame of a Bunsen burner (flame width 11 mm, inner flame height 20 mm, and outer flame height 40 mm) with the lower end of the specimen set near the upper portion of the inner flame for 10 seconds. Subsequently, the Bunsen burner was removed, and the time in seconds until the flame on the specimen was extinguished was measured. For each of 5 specimens, the ignition test was carried out twice, and the average value in seconds of the total 10 tests was taken as the index for the flame-retarding property.

Measurement of electrical characteristics. Tracking resistance was carried out as described in IEC. publ. 587, using the inclined flat plane method. The apparatus used in the test was a HAT-520 model tester manufactured by Hitachi Chemical Co., Ltd. The test voltage was 3.5 kV. Indices A and B listed as the measurement results in the provided Tables are defined as the time in minutes for the current flowing through the specimen in a high-voltage circuit to become higher than 60 mA and the time in minutes when tracking reached a mark placed at a site 25 mm from the lower electrode on the surface of the specimen.

Example 1. 100 parts of a dimethylsiloxane/- vinylmethylsiloxane copolymer with a degree of polymerization (dp) of 3000 end-blocked with vinyldimethylsiloxy groups and comprising 99.87 mol % dimethylsiloxy units and 0.13 mol % vinylmethylsiloxy units, 30 parts fumed silica with a specific surface area of 200 $m^2/g$, and 10 parts of a dimethylsiloxane oligomer end-blocked with dimethylhydroxysiloxy groups having a viscosity of 30 mPaxs used as a plasticizer were loaded in a mixer and homogeneously mixed. Subsequently, the mixture was mixed at 175° C. for 60 minutes to form a silicone rubber base. A reaction mixture of hexachloroplatinic acid/divinyltetramethyldisiloxane and 3,5-dimethyl-1-hexyn-3-ol (reaction mixture 1, with platinum metal content of 5000 ppm) in an amount corresponding to 30 ppm platinum in the base compound was added to the silicone rubber base and the mixture was homogeneously blended using a 2-roll mill. The reaction mixture 1 described above was prepared as follows: 100 parts of 3,5-dimethyl-1-hexyn-3-ol were added to 100 parts of the hexachloroplatinic acid/divinyltetramethyldisiloxane complex and the mixture shaken at room temperature. The mixture was then allowed to stand for 24 h.

Subsequently, 0.8 part of a paste-like mixture of 2,5-dimethyl-2,5-di(t-butylperoxy)hexane and 50 wt % silicone oil was added into the aforementioned mixture, and the mixture was blended homogeneously to form a curable silicone rubber composition. The flame-retarding property and electrical characteristics were then measured for the cured silicone rubber composition. The results of these measurements are listed in Table I.

For comparison a curable silicone rubber composition was prepared in the same way as in Example 1, except that instead of reaction mixture 1, a hexachloroplatinic acid/divinyltetramethyldisiloxane complex was added in an amount corresponding to 30 ppm platinum metal. Subsequently, the characteristics of the composition after curing were measured in the same way as in Example 1. The results are listed as Comparative Example 1 in Table I.

TABLE I

|  | Example 1 | Comparative Example 1 |
|---|---|---|
| Base Compound (Parts) | 100 | 100 |
| Reaction Mixture 1 (ppm Pt) | 30 | — |
| Flame Retarding (s) | 160 |  |
| Electrical Properties |  |  |
| Index A (Damage Time, Min.) | 200 | 50 |
| Index B (Time to Reach 25 mm, Min.) | 190 | 40 |

Example 2. 100 parts of dimethylsiloxane/- vinylmethylsiloxane copolymer with a dp of 3000 end-blocked with vinyldimethylsiloxy groups and comprising 99.87 mol % dimethylsiloxy units and 0.13 mol % vinylmethylsiloxy units, 30 parts fumed silica with a specific surface area of 200 $m^2/g$, and 10 parts of dimethylsiloxane oligomer end-blocked with dimethylhydroxysiloxy groups having a viscosity of 30 mPaxs used as a plasticizer, were loaded in a mixer and homogeneously mixed. Subsequently, the mixture was heated at 175° C. for 60 minutes to form a silicone rubber base. 0.15 Part benzotriazole and a reaction mixture comprising hexachloroplatinic acid/divinyltetramethyldisiloxane and 3,5-dimethyl-1-hexyn-3-ol (reaction mixture 2) in amounts corresponding to 5 ppm, 30 ppm, and 50 ppm platinum metal, respectively, were added to 100 parts of the aforementioned silicone rubber base, and each mixture was homogeneously mixed by a 2-roll mill. The reaction mixture was prepared as follows: 100 parts of 3,5-dimethyl-1-hexyn-3-ol were added to 100 parts of a hexachloroplatinic acid/divinyltetramethyldisiloxane complex and shaken at room temperature. The mixture was allowed to stand for 24 h. Subsequently, 0.8 part of a paste-like mixture of 2,5-dimethyl-2,5-di(t-butylperoxy)hexane and 50 wt % silicone oil was added to the aforementioned mixture, and the mixture was blended homogeneously to form a curable silicone rubber composition. The flame-retarding property and electrical characteristics were then measured for the curable silicone rubber composition. The results of the measurements are listed in Table II.

For comparison a curable silicone rubber composition was prepared in the same way as in Example 2, except that instead of reaction mixture 2, a hexachloroplatinic acid/divinyltetramethyldisiloxane complex was added in an amount corresponding to 30 ppm platinum metal. Subsequently, the characteristics of the composition after curing were measured in the same way as in Example 2. The results are listed under Comparative Example 2 in Table II.

TABLE II

|  | Example 2 | | | Comparative Example 2 |
|---|---|---|---|---|
|  | 1 | 2 | 3 |  |
| Base Compound (Parts) | 100 | 100 | 100 | 100 |
| Benzotriazole (Parts) | 0.15 | 0.15 | 0.15 | 0.15 |
| Reaction Mixture 1 (ppm Pt) | 5 | 30 | 50 | — |
| Physical Properties |  |  |  |  |
| Durometer (JIS-A) | 60 | 61 | 61 | 62 |
| Tensile (kgf/cm$^2$) | 105 | 109 | 105 | 110 |
| Elongation (%) | 450 | 470 | 440 | 470 |
| Tear A (kgf/cm) | 15 | 15 | 13 | 16 |
| Flame Retarding (s) | 168 | 135 | 131 | 235 |
| Electrical Properties |  |  |  |  |
| Index A (Damage time, Min.) | 232 | 330 | 345 | 145 |
| Index B (Time to 25 mm, Min.) | 215 | 290 | 295 | 123 |

Example 3. 100 Parts of a dimethylsiloxane/- vinylmethylsiloxane copolymer with a dp of 3000 end-blocked with vinyldimethylsiloxy groups and comprising 99.87 mol % dimethylsiloxy units and 0.13 mol % vinylmethylsiloxy units, 30 parts fumed silica with a specific surface area of 200 $m^2/g$, and 10 parts of dimethylsiloxane oligomer end-blocked with dimethylhydroxysiloxy groups having a viscosity of 30 mPaxs as a plasticizer were loaded in a mixer and homogeneously mixed. Subsequently, the mixture was mixed at 175° C. for 1 h to form a silicone rubber base. 0.15 Part benzotriazole and a reaction mixture (reaction mixture 3, containing 6000 ppm platinum) of 3 wt % of hexachloroplatinic acid in isopropyl alcohol and 2-methyl-3-butyn-2-ol in an amount corresponding to 30 ppm of platinum metal was added to 100 parts of the silicone rubber base, and the mixture was homogeneously blended by use of a 2-roll mill. The reaction mixture was prepared as follows: 100 parts 2-methyl-3-butyn-2-ol were added to 100 parts of the 3 wt % isopropyl alcohol solution of hexachloroplatinic acid and shaken at room temperature. The mixture was allowed to stand for 24 h. Subsequently, 0.8 part of a paste-like mixture of 2,5-dimethyl-2,5-di(t-butylperoxy) hexane and 50 wt % silicone oil was added to the mixture and the mixture was blended homogeneously to form a curable silicone rubber composition.

For comparison a curable silicone rubber composition (Comparative Example 3) was prepared in the same way as above, except that instead of reaction mixture 3, a 3 wt % isopropyl alcohol solution of hexachloroplatinic acid was added in an amount corresponding to 30 ppm of platinum metal. For these samples of curable silicone rubber compositions, after curing, the physical properties, flame-retarding property, and electrical characteristics were measured. The results are listed in Table III.

TABLE III

|  | Example 3 | Comparative Example 3 |
|---|---|---|
| Physical Property |  |  |
| Durometer (JIS-A) | 59 | 59 |
| Tensile (kgf/cm$^2$) | 100 | 100 |
| Elongation (%) | 430 | 430 |
| Tear A (kgf/cm) | 12 | 13 |
| Flame Retarding (s) | 132 | 220 |
| Electrical Properties |  |  |
| Index A (Damage Time, Min.) | 325 | 140 |
| Index B (Time to Reach 25 mm, Min.) | 303 | 110 |

Example 4. 100 Parts of polydimethylsiloxane having a viscosity of 10,000 mPaxs end-blocked with vinyldimethylsiloxy groups were mixed with 25 parts of fumed silica with a specific surface area of 200 m$^2$/g, 5 parts of hexamethyldisilazane a surface treating agent for the fumed silica, and 1.5 parts water. This mixture was mixed under vacuum at 170° C. for 2 h to form a silicone rubber base. 0.15 Part of this silicone rubber base, 1.4 parts of dimethylsiloxane/methylhydrogensiloxane copolymer (with content of silicon atom-bonded hydrogen atoms of 0.7 wt %), reaction mixture 1 used in Example 1 in an amount corresponding to 30 ppm (by weight) of platinum metal, and, as a catalyst for hydrosilylation reaction, a 3 wt % isopropyl alcohol solution of hexachloroplatinic acid in an amount corresponding to a platinum metal amount of 10 ppm were homogeneously blended to form a liquid curable silicone rubber composition. The liquid curable silicone rubber composition was cured and the physical properties, flame-retarding property, and electrical characteristics measured. The results of the measurements are listed in Table IV.

TABLE IV

|  | Example 4 |
|---|---|
| Physical Properties |  |
| Durometer (JIS-A) | 30 |
| Tensile (kgf/cm$^2$) | 80 |
| Elongation (%) | 730 |

TABLE IV-continued

|  | Example 4 |
|---|---|
| Tear A (kgf/cm) | 7 |
| Flame Retarding (s) | 150 |
| Electrical Properties |  |
| Index A (Damage Time, Min.) | 183 |
| Index B (Time to 25 mm, Min.) | 167 |

We claim:
1. A curable silicone rubber composition comprising:
    (A) 100 parts by weight of polyorganosiloxane comprising at least 2 silicon atom-bonded alkenyl groups in each molecule described by formula $R_aSiO_{(4-a)/2}$, where R represents a substituted or unsubstituted monovalent hydrocarbon group and a is a number from 1.95 to 2.05;
    (B) 10 to 100 parts by weight fine, having a particle size of 50 mm or smaller, powdery silica;
    (C) a reaction mixture comprising (a) platinum compound and (b) a compound comprising an alkynyl group and an alcoholic hydroxy group in each molecule, where the reaction mixture provides platinum in the range of 1 to 1000 parts by weight with respect to 1 million parts by weight ingredient (A); and
    (D) a curing agent in an amount sufficient for curing the composition.
2. A curable silicone rubber composition according to claim 1 further comprising
    (E) 0.01 to 10 parts by weight triazole compound.
3. The curable silicone rubber composition according to claim 1, where ingredient (a) is a complex of hexachloroplatinic acid and divinyltetramethyldisiloxane.
4. The curable silicone rubber composition according to claim 1, where ingredient (a) is hexachloroplatinic acid.
5. The curable silicone rubber composition according to claim 1, where ingredient (b) is 3,5-dimethyl-1-hexyn-3-ol.
6. The curable silicone rubber composition according to claim 1, where ingredient (b) is 2-methyl-3-butyn-2-ol.
7. The curable silicone rubber composition according to claim 1, where ingredient (D) is an organic peroxide.
8. The curable silicone rubber composition according to claim 1, where ingredient (D) comprises a polyorganohydrogensiloxane containing 3 or more silicon atom-bonded hydrogen atoms in each molecule and a hydrosilylation catalyst.
9. The curable silicone rubber composition according to claim 1, where 50 mole percent or more of the R groups in each molecule of ingredient (A) are methyl.
10. The curable silicone rubber composition according to claim 1, where ingredient (A) is selected from the group consisting of
    dimethylsiloxane/vinylmethylsiloxane copolymer end-blocked with vinyldimethylsiloxy groups, polydimethylsiloxane end-blocked with vinyldimethylsiloxy groups,
    dimethylsiloxane/vinylmethylsiloxane copolymer end-blocked with dimethylhydroxysiloxy groups,
    dimethylsiloxane/vinylmethylsiloxane copolymer end-blocked with vinylmethylhydroxysiloxy groups, and
    dimethylsiloxane/methylphenylsiloxane/vinylmethylsiloxane copolymer end-blocked with vinyldimethylsiloxy groups.
11. The curable silicone rubber composition according to claim 1, where ingredient (B) is a fumed silica having a surface area of 50 m$^2$/g or greater.

12. The curable silicone rubber composition according to claim 11, where the fumed silica is hydrophobed by treatment with an organosilane.

13. A curable silicone rubber composition according to claim 1, where the weight ratio of ingredient (a) to ingredient (b) is in the range of 1:0.1 to 1:100.

14. A curable silicone rubber composition according to claim 1, where the weight ratio of ingredient (a) to ingredient (b) is in the range of 1:1 to 1:50.

15. A curable silicone rubber composition according to claim 1, where ingredient (C) provides an amount of platinum in the range of 1 to 1000 parts by weight per 1 million parts by weight of ingredient (A).

16. A curable silicone rubber composition according to claim 1, where ingredient (C) provides an amount of platinum in the range of 10 to 200 parts by weight per 1 million parts by weight of ingredient (A).

17. A curable silicone rubber composition according to claim 2, where ingredient (E) is selected from the group consisting of benzotriazole, 1-methylbenzotriazole, 5,6-dimethylbenzotriazole, 2-phenylbenzotriazole, 1-methyl- 1,2,3-triazole, 1-phenyl-1,2,3-triazole, 4-methyl-2-phenyl-1,2,3-triazole, 1-methyl-1,2,4-triazole, and 1,3-diphenyl-1,2,4-triazole.

* * * * *